Jan. 26, 1965   J. J. KRATOCHVIL   3,167,324
GROMMET UNIT
Filed March 13, 1963
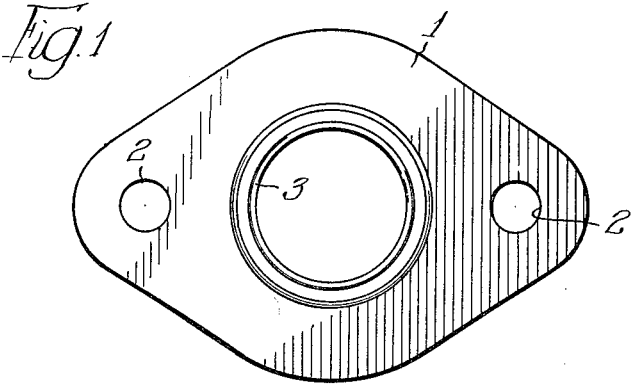
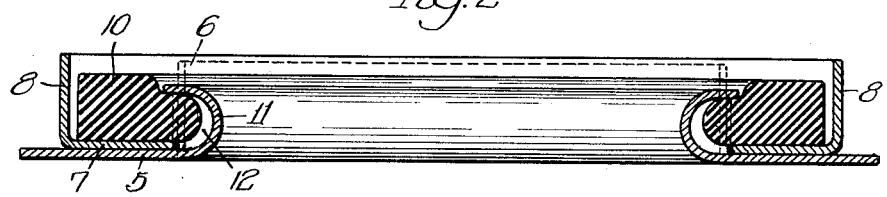
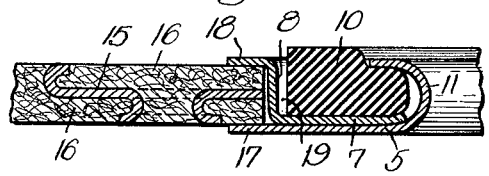   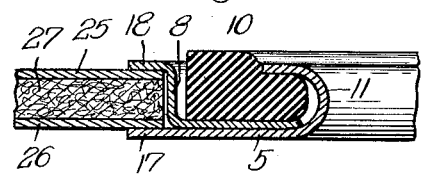
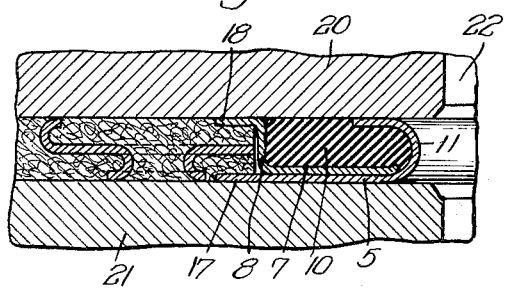   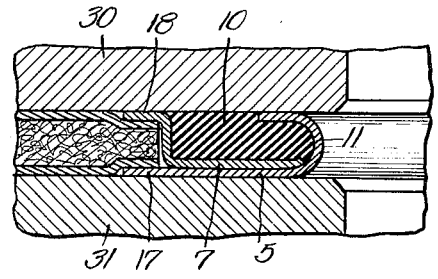
INVENTOR.
John J. Kratochvil,
BY George H. Simmons
ATTY.

United States Patent Office 3,167,324
Patented Jan. 26, 1965

3,167,324
GROMMET UNIT
John J. Kratochvil, Berwyn, Ill., assignor to Victor Manufacturing & Gasket Company, Chicago, Ill., a corporation of Illinois
Filed Mar. 13, 1963, Ser. No. 264,888
11 Claims. (Cl. 277—235)

This invention relates to a grommet unit for insertion in a perforation in a gasket and to a gasket containing such a unit, and has for its principal object the provision of a new and improved device of this kind.

It is a main object of the invention to provide an elastomeric grommet unit adapted to be fixed in a perforation in a gasket that has a metal core faced with compressible material such as asbestos bound with Portland cement, starch, silicate of soda, resins, rubber or synthetic elastomers, and also in a metal-faced gasket having a single inner layer of such compressible material.

Another object of the invention is to provide a grommet unit consisting of an elastomeric washer and metallic supporting and confining members of simple design, which unit enables the elastomeric washer to be installed in a compressible gasket and confined in the grommet unit to insure the formation of a seal mating with machine parts engaged by the grommet unit when the gasket and grommet unit are compressed.

Another object of the invention is to provide a grommet unit that can be manufactured at low cost without sacrificing quality.

Further objects of the invention not specifically mentioned here will be apparent from the detailed description and claims which follow, reference being had to the accompanying drawings in which a preferred embodiment of the invention is shown by way of example, and in which:

FIG. 1 is a plan view showing the invention applied to a gasket;

FIG. 2 is a cross sectional view through a grommet unit embodying the teachings of the invention;

FIG. 3 is a fragmentary view similar to FIG. 2 and showing the grommet unit installed in a gasket having a metal core and compressible facings;

FIG. 4 is a view similar to FIG. 3 and showing the grommet unit installed in a gasket having a compressible core and metal facings;

FIG. 5 is a view similar to FIG. 3 and showing the gasket and unit compressed between mating machine parts; and FIG. 6 is a view similar to FIG. 4 and showing the gasket and unit compressed between mating machine parts.

Mating machine parts containing fluid channels are usually fixed together with a compressible gasket interposed therebetween. In many instances a grommet is included in the gasket and registered with the channels in the machine parts to protect the material in the gaskets from the fluid and to form a fluid tight seal around the channel. In the prior art of which I am aware, frequently metal grommets have been used for this purpose.

Gaskets commonly used between mating machine parts, such as the head and block of an internal combustion engine for example, have included at least two main types. The first type consists of a metal core to each face of which a compressible facing, usually containing asbestos, is fixed. The second type consists of a compressible core, usually containing asbestos, to each face of which a metal facing is fixed. Gaskets of similar construction are also used to connect other parts, such as intake manifolds, as well as carburetors, pumps and the like, to the engine.

Heretofore when grommets have been used in gaskets of the first type they have invariably been metal. Elastomeric grommets have been used heretofore in gaskets of the second type and various arrangements have been used to secure the grommets between the metal faces of the gasket and to control deformation of the grommets into the fluid channels as they are compressed.

The present invention provides an inexpensive grommet unit which can be used equally well with both types of gaskets.

In its preferred form the grommet unit of the present invention includes an elastomeric washer of simple design and rectilinear in cross section, clamped by two metal supporting members which secure the assemblage in a perforation in a gasket. Copper in the range of .008" to .015" thickness has been found to be a satisfactory metal for use in the unit, nevertheless the use of other metals in various thicknesses is contemplated. A metal member of the grommet unit engages only the inner portion of the upper surface of the washer, leaving the major portion of that surface exposed. This metal member of the grommet unit is positioned between the inner edge of the washer and the channel and thereby prevents distortion of the washer into the channel. The outer portions of the grommet unit engage both faces of the gasket to secure the assemblage therein.

When the grommet unit is fixed in a gasket and the gasket and unit are in uncompressed state, the elastomeric washer does not fill the supporting members but rather there are spaces within the unit on both the inner and outer edges of the washer. When the gasket and grommet unit are compressed between machine parts, the elastomeric washer is distorted and fills these spaces completely, thereby exerting and maintaining equal pressure in all directions to effectively seal the machine parts.

Referring now to the drawings in more detail, in FIG. 1 is shown a simple two-bolt flange gasket 1, having the usual clean cut holes 2 through which the clamping bolts are projected to center the gasket with respect to the machine parts. As shown, the gasket is equipped with a grommet unit 3 which embodies the teachings of the present invention.

As will be seen best in FIG. 2, the supporting portion of the grommet unit consists of a pair of metallic members composed of a readily deformable metal such as copper, cold rolled steel, tinplated steel, stainless steel, copper alloys, brass, aluminum or aluminum alloys, the lower one of which contains a planar portion 5 and initially an integral wall upstanding from the inner edge of the planar portion as indicated at 6 by the dotted lines. The upper metallic member contains a planar portion 7 that is registered with the portion 5 and the wall 6. The upper member also contains a wall 8 upstanding from the outer edge of the portion 7. This inner wall 6 is formed over into arcuate shape, as indicated at 11, the upper end of the wall engaging the upper surface of the elastomeric washer adjacent the inner edge thereof and compressing the elastomeric washer into the shape shown in FIG. 2. This clamping of the elastomeric washer against the metal members holds the grommet unit together.

It will be noted that a major portion of the upper surface of the elastomeric washer remains undisturbed and that it is positioned above the distal end of the wall 11. It will also be noted that there is a space 12 between the wall 11 and the innermost edge of the elastomeric washer.

Referring now to FIG. 3, wherein the grommet unit is shown applied to a gasket having a metal core 15 to the faces of which a compressible material 16 is fixed, this material preferably contains asbestos fibers, as is customary in gaskets of this type. It will be noted that the outermost portion 17 of the portion 5 engages the lower surface of the gasket and that the wall 8 of portion 7 is formed over into engagement with the upper surface of the gasket, as indicated at 18. The grommet unit is thus secured in the gasket. It will also be noted that there is a space 19 around the outer edge of the elastomeric washer and between that edge and the wall 8 of the supporting member.

As will be seen in FIG. 4, when the gasket shown in FIG. 3 is compressed between mating machine parts 20 and 21, the gasket and grommet unit are compressed. This compression of the elastomeric washer distorts it inwardly to fill the space 12, FIG. 2, and to bring the innermost edge of the elastomeric washer into engagement with the wall 11. This distortion of the elastomeric washer also extends outwardly into engagement with the wall 8. Thus the washer being under compression uniformly in all directions forms a fluid tight seal with the machine part 20, and the portion 5 of the supporting members forms a seal with the member 21. Wall 11 prevents distortion of the elastomeric washer into the fluid channel 22 in the machine parts.

In FIG. 5 the grommet unit is shown applied to a gasket having metal faces 25 and 26 and having a compressible single thickness layer 27 disposed between the facing layer. The outer portion 17 of the portion 5 engages the lower facing member 26, and the formed over portion 18 of the wall 8 engages the upper facing member 25. When the gasket and grommet unit are compressed between mating machine parts 30 and 31, as shown in FIG. 6, the elastomeric washer 10 is distorted to fill the space within the unit as before and to form a fluid tight seal with the machine part 30. The portion 5 of the member forms a seal with the machine part 31.

Thus it will be seen that the grommet unit of the present invention permits the use of an elastomeric washer of simple design, shown to have rectangular cross section. The washer and supporting members are secured together prior to insertion in a gasket and the grommet unit is secured in the gasket by a simple operation of forming the outer wall of the outer supporting member outwardly and into engagement with the upper surface of the gasket.

While I have shown the grommet unit as being circular in plan view and as applied to a simple gasket such as may be employed in securing the carburetor to the intake manifold of an internal combustion engine, I have done so by way of example only. It is essential that the outer wall 8 be dimensioned to snugly fit in the perforation in a gasket in which the grommet unit is to be installed, and in case the fluid channel in the machine parts is non-circular, walls 8 and 6 will be shaped to conform to the shape of the channel. The elastomeric washer will, of course, be shaped to conform to the shape of the supporting unit.

From the foregoing, it will be apparent that the supporting unit of the present invention enables elastomeric washers to be used in gaskets where, in the prior art of which I am aware, only metal grommets could be used. The grommet unit of the present invention is of simple design and is a unitary structure that can be handled easily prior to insertion in a gasket.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What I claim is:

1. A grommet unit for insertion in a perforation in a compressible gasket, comprising:
    (1) a pair of planar members disposed one upon the other;
    (2) a deformable washer disposed upon the upper one of said members;
    (3) an integral extension of the bottom one of said members curving upwardly therefrom and from the inner edge of the washer and over the upper surface of the washer adjacent said edge to compress the inner portion of the washer and thereby hold the unit together;
    (4) an integral extension of said upper member extending upwardly from the outer edge thereof to a plane disposed above the exposed surface of the washer, said latter extension being disposed outwardly of the outer edge of the washer and inwardly of the outer edge of the lower member and being shaped and dimensioned to snugly fit in the perforation in a gasket and the upper portion of said later extension being adapted to be formed outwardly and downwardly below the upper surface of the washer and into engagement with the upper surface of a gasket to secure the unit thereto.

2. A unit as specified in claim 1, in which the planar members are composed of metal.

3. A unit as specified in claim 1, in which the planar members are in the range of .008 to .015 inch in thickness and are composed of metal from the group consisting of copper, copper alloys, brass, aluminum, aluminum alloys, cold rolled steel, tinplated steel and stainless steel.

4. A unit as specified in claim 1, in which the washer is composed of a readily deformable elastomeric material that is impervious to the fluid to be sealed.

5. A unit as specified in claim 1, in which the washer in uncompressed state is rectangular in cross section and is shaped to conform to the shape of the channel that is to be sealed.

6. A unit as specified in claim 1, in which the exposed portion of the upper surface of the washer constitutes a substantial portion of that surface.

7. A compressible gasket containing a perforation, a grommet unit fixed in the perforation; a deformable washer secured in said unit and having an exposed portion extending above the unit and upper surface of the gasket in uncompressed state, said unit confining the washer when the gasket and grommet unit are compressed to insure seal forming engagement of the exposed portion of the washer with a machine part engaged thereby.

8. A gasket as specified in claim 7, in which the grommet unit comprises a pair of metal members engaged together with one member engaging one face of the gasket and also clamping the washer to the unit and the other member engaging the edge of the gasket defining the perforation therein and also engaging the other face of the gasket to fix the grommet unit therein.

9. A gasket as specified in claim 8, in whcih the clamping portion of the one member is spaced inwardly of the inner edge of the washer when the gasket is in uncompressed state into which space the washer moves as it is deformed by compression.

10. A gasket as specified in claim 8, in which the portion of the other member that engages the edge of the gasket is disposed outwardly from the outer edge of the washer to provide space around the washer when the gasket is in uncompressed state into which space the washer moves as it is deformed by compression.

11. A gasket as specified in claim 7, in which the washer is composed of an elastomeric material and in uncompressed state is rectangular in cross section.

References Cited in the file of this patent

UNITED STATES PATENTS

| | | |
|---|---|---|
| 2,191,044 | Seligman | Feb. 20, 1940 |
| 2,199,647 | Muller et al. | May 7, 1940 |
| 2,681,241 | Aukers | June 15, 1954 |